(12) United States Patent
Reiser et al.

(10) Patent No.: US 7,771,663 B2
(45) Date of Patent: *Aug. 10, 2010

(54) CATALYTIC COMBUSTORS KEEPING CONTAINED MEDIUM WARM IN RESPONSE TO HYDROSTATIC VALVE

(75) Inventors: Carl A. Reiser, Stonington, CT (US); Kazuo Saito, Glastonbury, CT (US); James Cameron, Sarasota, FL (US); Gennady Resnick, South Windsor, CT (US)

(73) Assignee: UTC Power Corporation, South Windsor, CT (US)

( * ) Notice: Subject to any disclaimer, the term of this patent is extended or adjusted under 35 U.S.C. 154(b) by 511 days.

This patent is subject to a terminal disclaimer.

(21) Appl. No.: 11/794,599

(22) PCT Filed: Oct. 31, 2005

(86) PCT No.: PCT/US2005/039480

§ 371 (c)(1),
(2), (4) Date: Jun. 29, 2007

(87) PCT Pub. No.: WO2006/071350

PCT Pub. Date: Jul. 6, 2006

(65) Prior Publication Data

US 2009/0280036 A1    Nov. 12, 2009

(51) Int. Cl.
  *F01N 3/20*  (2006.01)
  *H01M 8/04*  (2006.01)
(52) U.S. Cl. .................. 422/105; 422/190; 422/197; 429/22; 429/24; 431/268; 431/328; 431/329
(58) Field of Classification Search ............... 422/105, 422/107, 190; 429/22, 24; 431/268, 328, 431/329
See application file for complete search history.

(56) References Cited

U.S. PATENT DOCUMENTS

| | | | | |
|---|---|---|---|---|
| 5,178,530 A | * | 1/1993 | Roldan et al. | 431/75 |
| 6,699,032 B2 | * | 3/2004 | Hermann et al. | 431/202 |
| 7,410,619 B2 | * | 8/2008 | Reiser et al. | 422/105 |
| 2004/0209206 A1 | * | 10/2004 | Hockaday et al. | 431/2 |

* cited by examiner

*Primary Examiner*—N. Bhat
(74) *Attorney, Agent, or Firm*—M. P. Williams (57) ABSTRACT

Water in a fuel cell accumulator is kept above freezing by a hydrogen/oxygen catalytic combustor fed hydrogen through a mechanical thermostatic valve in thermal communication with the container and connected to a hydrogen supply. The system includes an ejector hydrogen/oxygen combustor and a diffusion hydrogen/oxygen combustor for warming a medium within a container such as water in the accumulator of a fuel cell in response to a mechanic hydrostatic valve which conducts hydrogen to a combustor responsive to the temperature of the container.

27 Claims, 11 Drawing Sheets

CATALYTIC COMBUSTORS KEEPING CONTAINED MEDIUM WARM IN RESPONSE TO HYDROSTATIC VALVE

This application is a 371 of PCT/US05/394480, filed Oct. 31, 2005.

TECHNICAL FIELD

This invention relates to catalytic combustors, including an ejector hydrogen/oxygen combustor and a diffusion hydrogen/oxygen combustor, for warming a medium within a container, such as water in the accumulator of a fuel cell power plant, in response to a mechanical hydrostatic valve which conducts hydrogen to a combustor in dependence upon the temperature of the container.

BACKGROUND ART

Fuel cell power plants include a stack of fuel cells, each cell having anode and cathode catalysts surrounding an electrolyte, such as phosphoric acid or a proton exchange, polymer electrolyte membrane. In either case, one product of the process is water, which must be removed from the cathode in order to prevent flooding. In PEM fuel cells, it is necessary to keep the anode side of the membrane from becoming dry, a condition which impedes the process of generating electricity. Therefore, water management is important.

In many applications, including stationary applications, space applications and vehicular applications, fuel cell power plants may be utilized in freezing environments, that is, where temperatures will fall below 0° C. (32° F.). When the fuel cell power plant is operating, it produces sufficient heat to maintain all of the water in the system above freezing; however, when the fuel cell power plant is inoperative at subfreezing temperatures for sufficient periods of time, water may freeze resulting in the potential for physical damage as well as causing the fuel cell power plant to be initially inoperable when startup thereof is desired.

In vehicular applications, a desirable criteria is the ability to operate the vehicle, with electricity generated by the fuel cell power plant, in less than one minute (or even less than 40 seconds) following the initial indication of startup, such as by turning of a key or other switch.

In the prior art, procedures have been devised for draining all or part of the water from water flow systems into an accumulator at shutdown, thereby to avoid mechanical damage as a result of ice formation in some or all of the components of the fuel cell stack and its related water management system. However, upon startup, especially at temperatures below −20° C. (−70° F.), melting of the ice in the accumulator and in the associated pumps, conduits and heat exchangers (if not drained) is necessary in order to provide water management and/or coolant to the fuel cell power plant before operation thereof can be sustained.

In U.S. Pat. No. 6,797,421, the fuel cell stack, the accumulator, the water pump and heat exchanger are all disposed within an insulated enclosure which is heated by a hydrogen/oxygen catalytic combustor, which is either disposed within the enclosure, or externally thereof, the heat being communicated via a small inlet duct or hood in the lower portion of the enclosure. In this known apparatus, one or more temperature sensors are disposed at various critical points within the enclosure, the temperature indicating signal(s) of which are provided to a controller which in turn controls either static or intermittent flow of hydrogen through a valve to the catalytic combustor. There is no disclosure of controlling the amount of air that is provided to the combustor. The controller, of course, must be provided with electrical power throughout the time that the fuel cell power plant is inoperative at subfreezing temperatures, the source of such power not being disclosed. The temperature of the catalytic combustor therein is set to operate between 93° C. (200° F.) and 370° C. (700° F.), which causes inefficient operation of the combustor.

In U.S. 2002/0068202, it is suggested that a fuel cell power plant (referred to therein as a battery) can be operated with a minimal load, either continuously or in response to a temperature sensor, so that the electrolyte of the fuel cells remain above freezing.

There are situations other than within the framework of fuel cell power plants wherein maintaining a suitable temperature of an object, a medium in a container or a space is required.

DISCLOSURE OF INVENTION

Objects of the invention include: maintaining the temperature of a medium within a container above a desired temperature without the use of electricity; keeping water, in an inoperative fuel cell power plant at subfreezing temperatures, from freezing without the use of electricity; efficient catalytic combustion of hydrogen; a self-igniting, ignition sustaining catalytic combustor; a long life catalytic combustor; hydrogen/oxygen combustors which operate at temperatures below 150° C. (302° F.); catalytic combustors which can operate without any electrical controls; a keep warm heater for the accumulator of a fuel cell stack which operates without electricity; and high efficiency hydrogen/oxygen catalytic combustors.

The invention is predicated partly on the recognition that catalysts on porous metal substrates provide more heat at any given temperature (consume more $H_2$) than those on ceramic substrates, and partly on the recognition that effective catalytic heating must avoid entrainment of water produced by combustion.

According to the invention, a medium within a container, such as water within the accumulator of a fuel cell, is maintained above freezing by combusting hydrogen from a supply which is provided in response to the temperature of the container through a valve having a temperature responsive element in thermal communication with the container. The valve is typically a mechanical valve that operates thermostatically, hydrostatically, by spring action or the like so that it functions without the need of external power.

In accordance with the invention, a hydrogen/oxygen catalytic combustor comprises an ejector having hydrogen provided to its principal inlet and air available at its secondary inlet, the ejector outlet being provided to a hydrogen/oxygen combustion catalyst.

In accord with the invention, a combustor comprises combustion catalyst supported on a porous metal substrate, whereby to create more heat below maximum safe catalyst temperature.

In further accord with the present invention, a hydrogen/catalytic combustor comprises a hydrogen/oxygen combustion catalyst which is separated from a heating surface on a first side and separated from a diffusion control device disposed in air on a second side, hydrogen being conducted to the first side of the catalyst. A diffusion control device prevents convective $O_2$ flow to the burner to the maximum practical extent possible. Such control devices could include for example a perforated plate of metal, plastic or other suitable materials, a series of plates, a long tube, a porous body, including combinations of these elements or the like that helps to provide a non-convective flow. The invention in one form includes an insulator surrounding the catalyst and the spaces above and below the catalyst, with the diffusion control device extending to substantially the periphery of the insulator.

In still further accord with the invention, a catalytic combustor includes a porous, cylindrical, catalyst-coated substrate having hydrogen fed to the inner surface thereof and an oxygen diffusion control device spaced from the outer surface thereof.

Process water vapor above the catalyst is condensed on a surface having a hydrophilic mesh adjacent to the surface leading to a wicking material, which has pores smaller than the pores of the mesh, the wicking material conducting the condensed process water downwardly to the surrounding atmosphere. In still further accord with the invention, to prevent the formation of icicles by process water which is conducted to the atmosphere, a box of soluble material which in solution with water has a sufficiently low freezing temperature receives the process water. In an alternative embodiment of the invention, the water is mixed with an antifreeze before being released to atmosphere.

The invention may include a metal screen to assist in distributing the hydrogen to the catalyst. The catalyst may comprise a porous cylinder with the hydrogen inlet conduit and the wicking material passing through the center thereof.

The invention uses a valve, typically a mechanical valve, either in contact with an object or vessel of interest, such as the accumulator of a fuel cell power plant, or responsive to ambient temperature in a space or surrounding the vessel or object of interest. When responsive to ambient temperature, the invention may include a timer valve in series with the mechanical valve so as to not generate heat, even though the temperature is below freezing, when the space or object of interest, such as the water in an accumulator, will certainly be above freezing due for instance, to shutdown of the fuel cell only within a few days.

Further, the catalyst comprises a hydrophobic, porous metal substrate, the interior surfaces of which are wash coated with a mixture of TEFLON and a noble metal, such as platinum, palladium and alloys thereof, so as to not entrain moisture generated during combustion.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
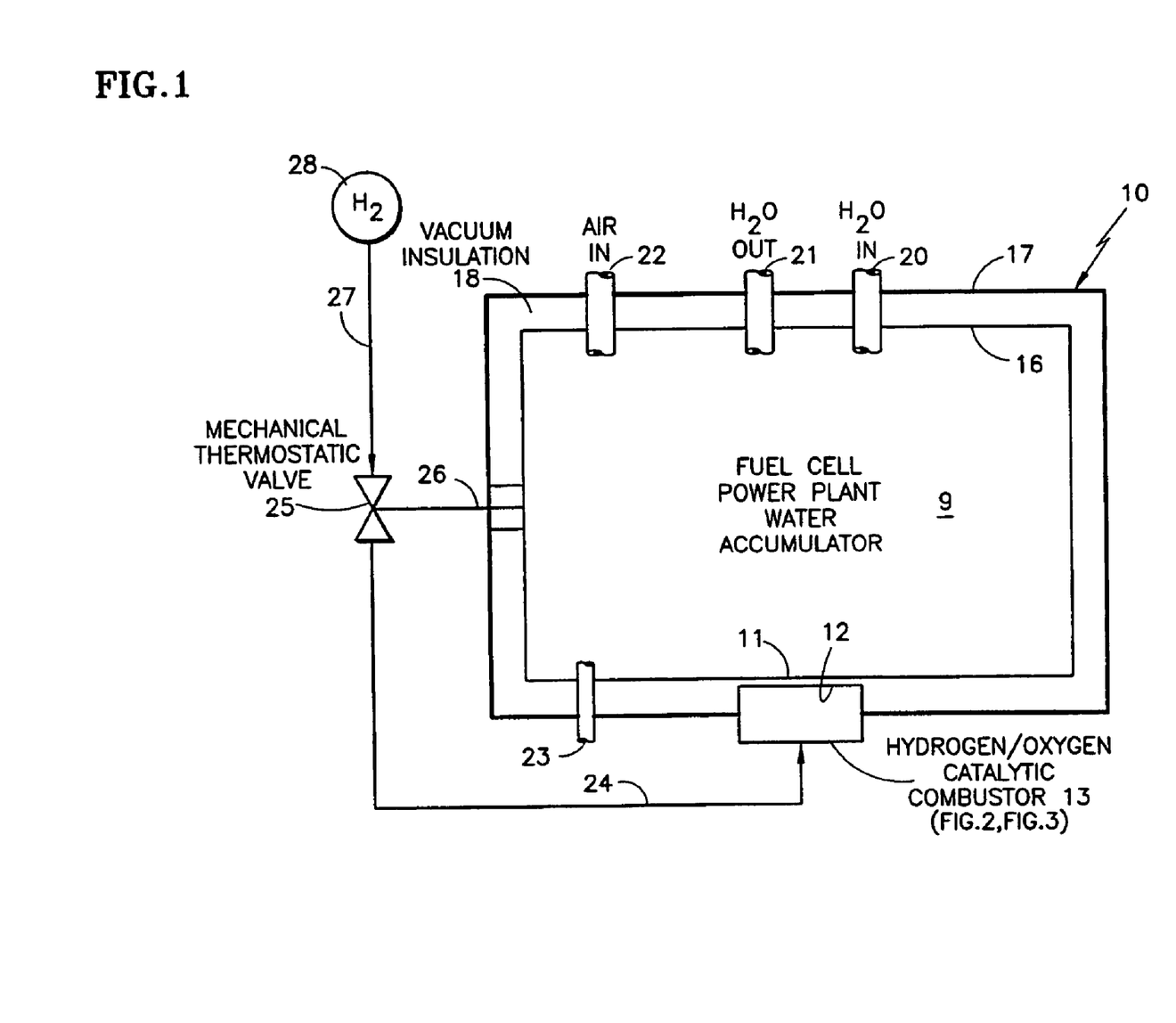
FIG. 1 is a stylized, simplified schematic illustration of an embodiment of the invention which senses temperature of the accumulator.

Referring to FIG. 1, a medium 9 within a container, such as a fuel cell power plant accumulator 10, is heated through a heatable surface 11 which is in thermal communication with a heating surface 12 of a hydrogen/oxygen catalytic combustor 13. The accumulator 10 may comprise a Dewar having inner and outer walls 16, 17 with vacuum 18 therebetween. The accumulator may have conventional water inlet 20 and outlet 21, an air inlet 22, and a drain/vent 23.

The combustor 13 is provided with hydrogen over a conduit 24 from a source 25 which comprises a mechanical thermostatic valve, in thermal communication 26 with the container 10, the valve being connected by a conduit 27 to a supply of hydrogen under pressure 28. The hydrogen supply 28 may comprise the source of fuel reactant gas for a fuel cell power plant. The hydrogen may be substantially pure, or contained within a hydrogen-rich reformate or other gas.

The valve 25 is set so that it will become open if the accumulator 10 falls below a first temperature, and will close whenever the accumulator 10 reaches a second temperature, higher (or at least not lower) than the first temperature. Whenever hydrogen is passed through the valve 25, it will automatically react with available oxygen within the combustor 13, thus providing heat through the surfaces 11, 12 to the accumulator 10.

Figure 2:
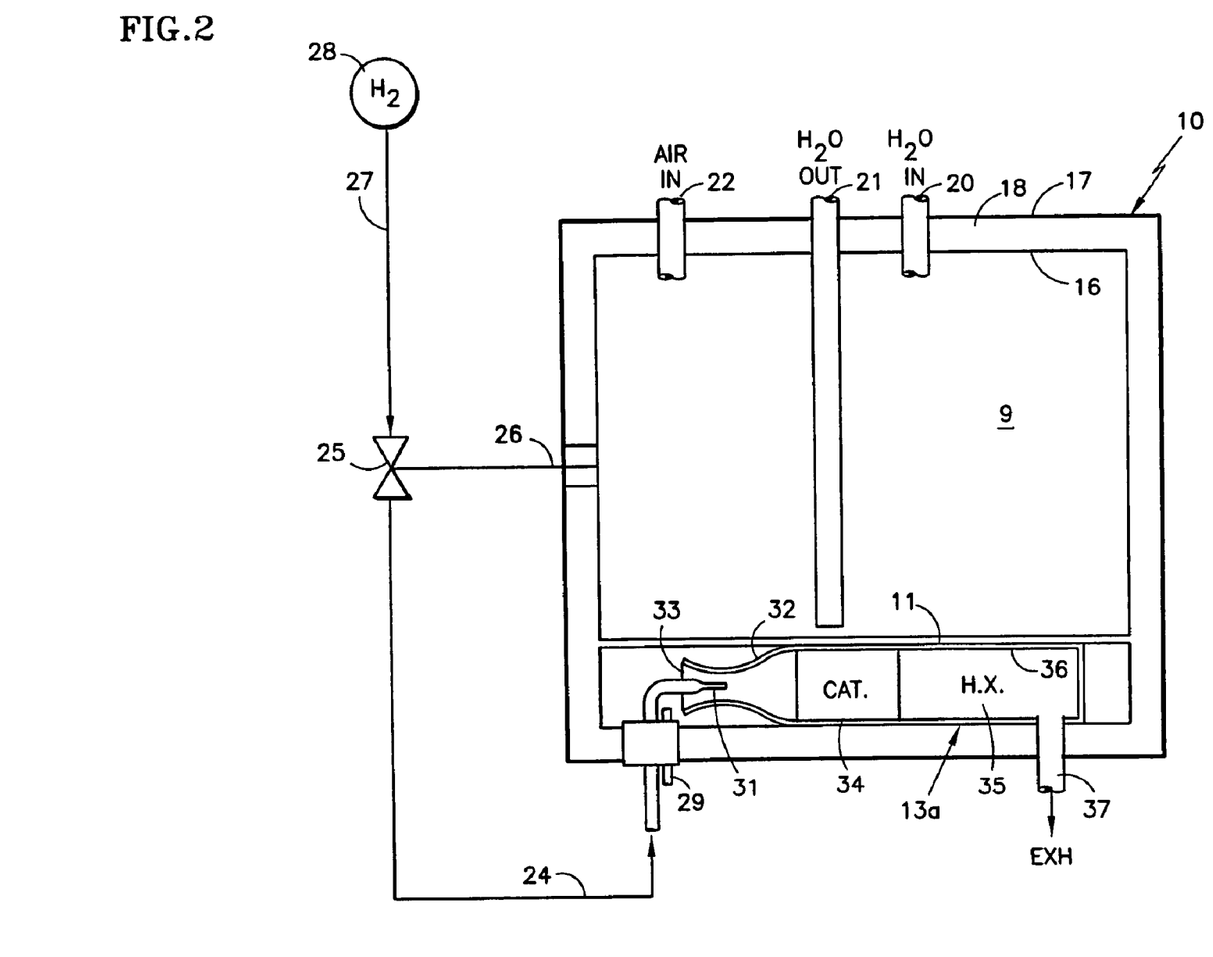
FIG. 2 is a simplified, stylized illustration of the invention employing a hydrogen/oxygen ejector catalytic combustor according to the invention.

In FIG. 2, the combustor 13a comprises an ejector-type, hydrogen/oxygen catalytic combustor. Hydrogen from the conduit 24 is fed through a fuel inlet valve 25 to the primary inlet 31 of an ejector 32, the secondary inlet 33 of which receives oxygen through a passage 29. The outlet of the ejector is fed to a hydrogen/oxygen catalyst 34, which may include platinum, palladium, alloys thereof or other suitable noble metals and alloys. A space downstream of the catalyst 34 comprises a heat exchanger 35, having a heating surface 36 which is in thermal communication with the heatable surface 11 of the accumulator 10. Thermal communication with the heatable surface may be enhanced by adding a conductive material, such as aluminum or the like, between the heater and the heatable surface. The moisture and any unconsumed gases are vented through an exhaust 37.

Figure 3:
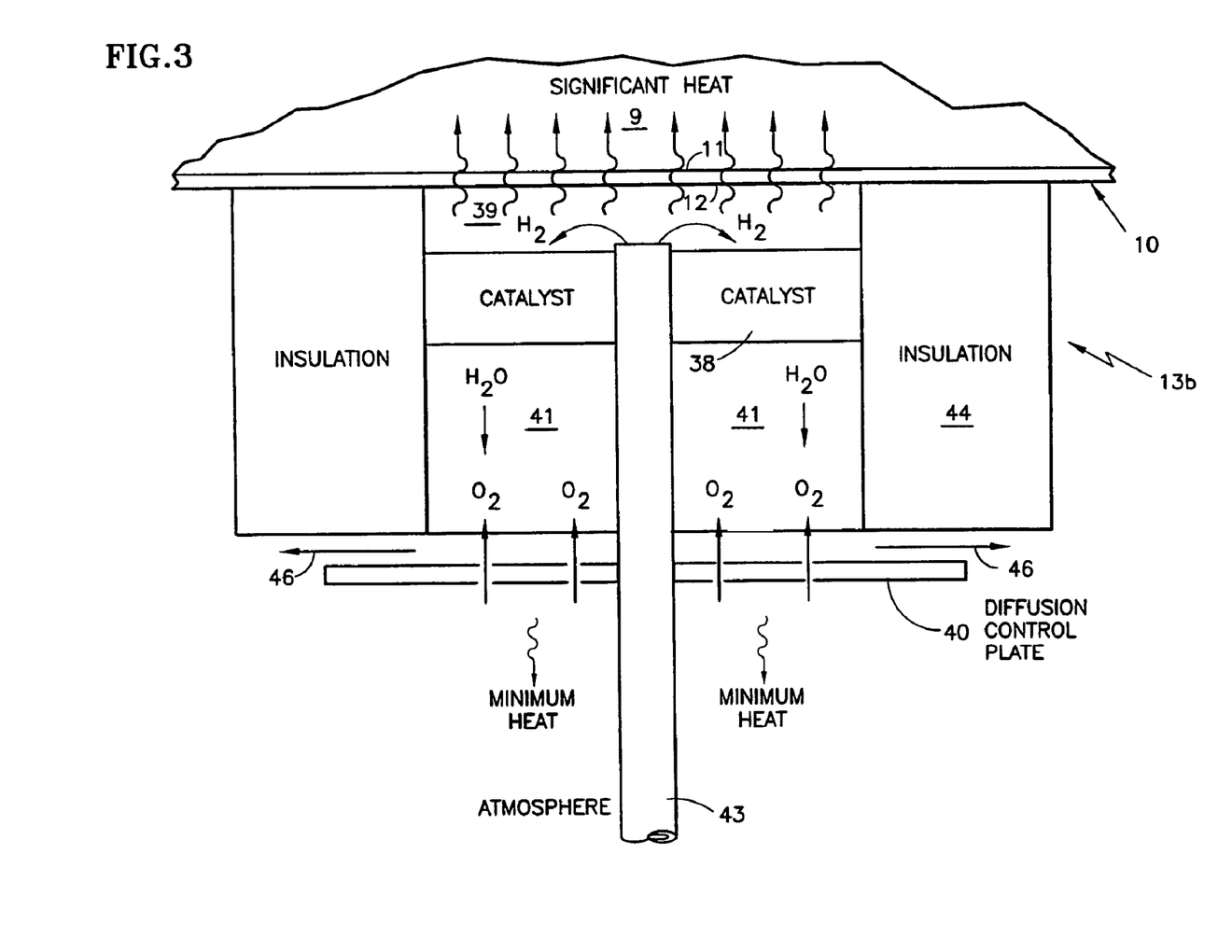
FIG. 3 is a simplified, stylized illustration of a simple embodiment of a low temperature diffusion type hydrogen/oxygen catalytic combustor according to the invention.

Referring to FIG. 3, a low temperature, diffusion-type combustor 13b comprises, in the disclosed embodiment, a porous, cylindrical hydrogen/oxygen catalyst 38 which is separated from the heating surface 12 thereof by a space 39, and a diffusion control device 40 which is separated from a second side of the catalyst 38 by a space 41. The diffusion control device 40 acts as a heat loss barrier as well, resisting the flow of heat downwardly out of the combustor 13b.

Hydrogen is supplied above the catalyst to the space 39 by a pipe 43. Hydrogen will combust with any oxygen in the catalyst, causing the partial pressure of oxygen to be reduced, whereby oxygen will diffuse through the diffusion control device 40 (as previously described). Thus, because of the diffusion control device 40, substantially only oxygen diffuses into the space 41, rather than having air, which is mainly nitrogen, flowing into the space. This is therefore referred to as a diffusion combustor.

Figure 11:
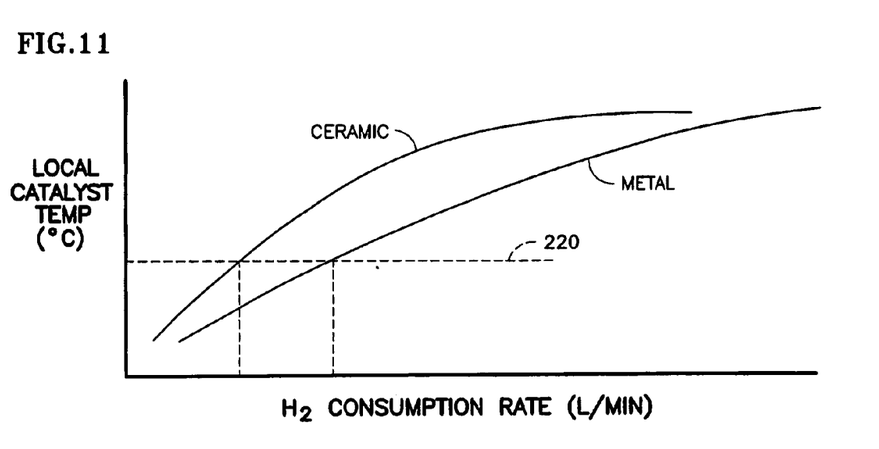
FIG. 11 is a chart illustrating hydrogen consumption of catalyst supported on ceramic and metal.

One aspect of the present invention is the realization that a catalyst assembly which utilizes a porous metal substrate will generate heat at a lower temperature than will a similar, ceramic substrate. FIG. 11 illustrates the local catalyst temperature (that is, within the catalyst assembly itself) as a function of the rate of consumption of hydrogen. At the maximum safe temperature of the catalyst (above which severe damage to the catalyst would occur), indicated by the dashed line 220, it is seen that there is a significant increase in hydrogen consumption, and therefore the rate of generating heat. Thus, the invention promotes low temperature, long life catalytic combustion of hydrogen.

In a specific embodiment herein, insulation 44 surrounds the catalyst, and the diffusion control device 40 extends outwardly past the space 41 across a substantial portion of the insulation 44, or it may extend across all of the insulation 44. The reaction products of the catalytic burn of hydrogen with oxygen are heat and water. The ambient temperature on the underside of the device 40 is presumed to be below freezing. To prevent ice and frost buildup around the bottom of the burner, some water that forms in the catalyst can mix with air that leaks through the diffusion control device 40, forming a stream of warm moist air as indicated by the arrows 46, which prevents the product water from freezing on or below the diffusion control device 40. The partial pressure of steam in the stream 46 is low, which minimizes frost formation surrounding the burner 13b.

Figure 4:
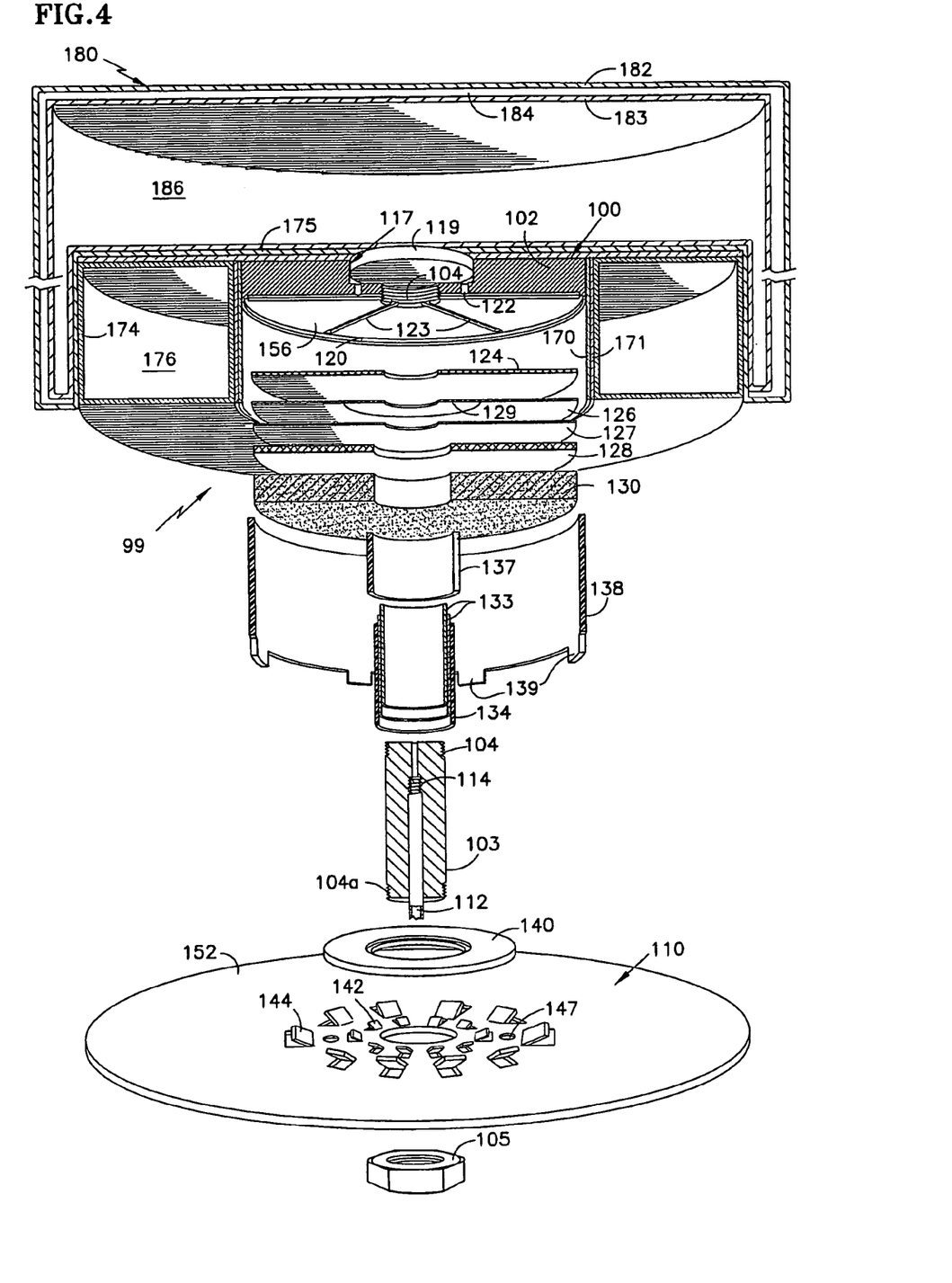
FIG. 4 is a partially broken away, partially sectioned partially exploded view of a diffusion catalyst with a container to be heated thereby.
Figure 5:
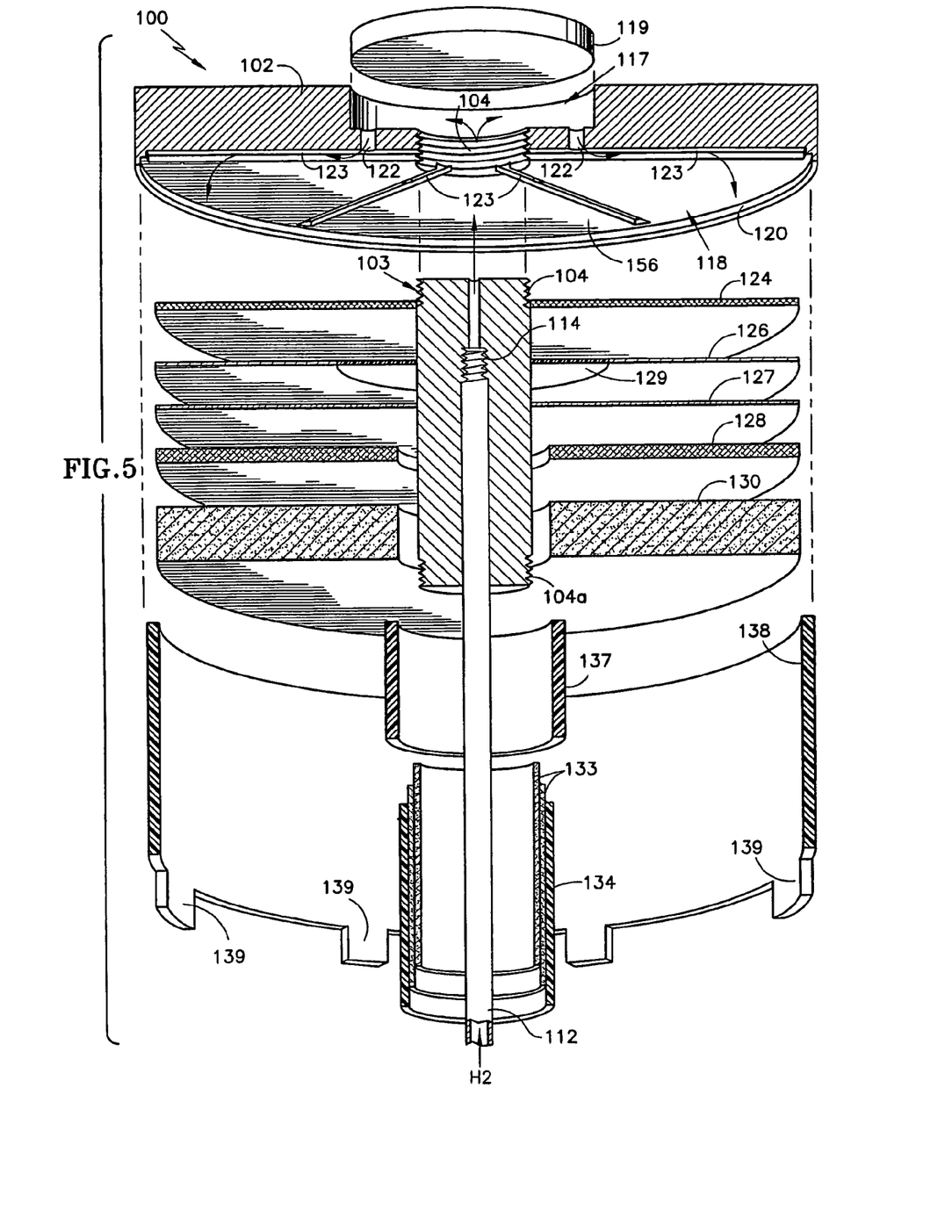
FIG. 5 is a sectioned exploded view of the upper portion of a diffusion catalyst according to one embodiment of the invention.
Figure 6:
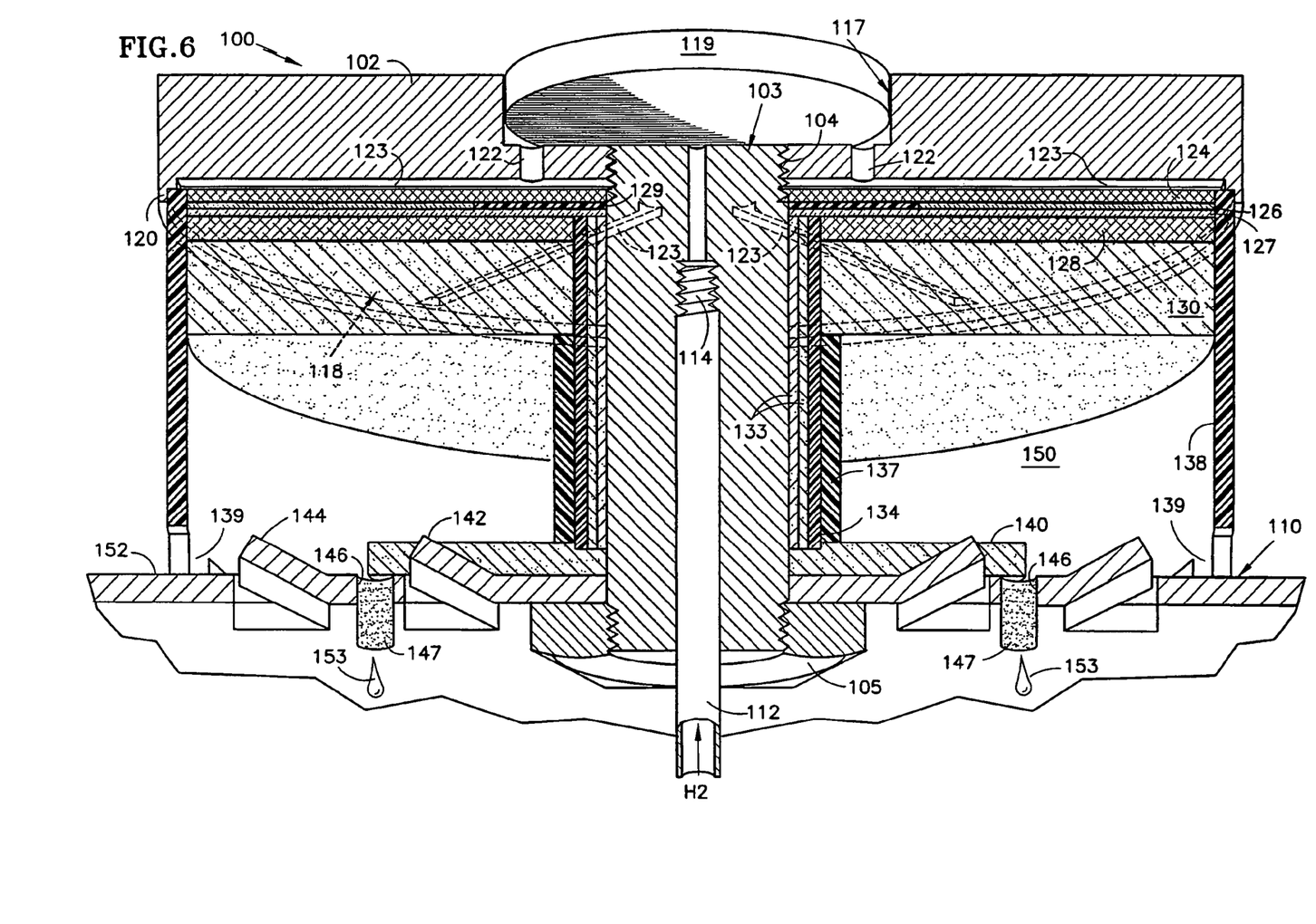
FIG. 6 is a sectioned side elevation view, partially broken away, of a diffusion catalyst according to the embodiment of FIG. 5.

A specific example of the diffusion heater of FIG. 3 is illustrated in FIGS. 4-6. FIG. 4 is a partially broken away, partially exploded dual-perspective view of an exemplary embodiment of a diffusion combustor according to the invention. The assembly 99 is round with an upper part 100, and is assembled with a stainless steel machined piece 102 at the top, into which a hollow-centered bolt 103 is secured by threads 104. The bottom of the bolt has threads 104a with which a nut 105 engages. A louvered plate 110 has a diameter twice or more the diameter of the stainless piece 102, the assembly 99 being held together by the bolt and nut between the louver plate 110 and the stainless piece 102.

A hydrogen (H2) feed pipe 112 extends from a tank (elsewhere, not shown) about ¾ of the way up through the hole in the bolt 103, where there are threads 114 to engage the end of the hydrogen feed pipe 112 to the inside of the bolt 103.

Referring to FIG. 5, the piece 102 has a central bore 117 on the top, and a very large counter bore 118 which leaves a lip 120 on the bottom. Six holes 122 are drilled through the bottom of the bore 117 and there is a radially extending groove 123 for each hole. The hydrogen then will flow up through the bolt into the bore 117 down through the holes 122 outwardly through the grooves 123 and then into a stainless steel screen 124 that extends throughout the bore 118.

Referring to FIG. 5, below the screen 124 there are two layers of hydrophilic, carbon paper 126, 127. Below that, there is a TEFLON® screen 128. The TEFLON screen 128 is just above a porous stainless steel substrate 130 with an admixture of TEFLON and either platinum or palladium, or an alloy of either or both of them, there being about 2.0 grams per liter of platinum/palladium, and about 0.4 g/l of Teflon. This makes the catalyst 130 hydrophobic so that any moisture that does form in the catalyst will not be entrained thereby, but will pass downwardly by means of gravity, to avoid flooding.

The upper sheet of carbon paper 126 is impregnated with KYNAR® (plastic) 129 to densify it for a short distance surrounding the bolt 103. This is to prevent the hydrogen from flowing directly downwardly, and to help deflect the hydrogen outwardly (see flow arrows on FIG. 5). Surrounding the bolt 103 is a wicking material 133, such as fibrous paper material similar to paper towels, and a plastic pipe 134 surrounding the wicking material 133 to provide support therefor. There is also a plastic pipe 137 that supports the inner portion of the catalyst 130.

Referring to FIG. 6, the wicking material 133 sets into a recess within a disk 140 of wicking material which extends out past a first ring of louvers 142 in the louvered plate 110. Portions of the wicking disk 140 which interfere with the louvers can either be removed, or pushed upwardly out of the way, in a conventional fashion. In FIGS. 4 and 6, the louvered plate 110 has a second ring of louvers 144 outward of the first ring of louvers 142, and there are two diametrically opposite holes 146 that have plugs 147 of wicking material extending therethrough.

The louvered plate 110 is separated from the remaining part of the structure, such as by on the order of 4 mm (0.16 inches) by extensions 139 on an outer sleeve 138 to promote a flow of warm moisture (water vapor), which prevents ice from forming that could otherwise block the louvers.

Referring to FIG. 4, the upper part 100 of the device 99 is wrapped in reflecting film 170, 171 such as aluminum adhesive tape, to form a hydrogen barrier. The upper part 100 of the device is surrounded by a square cross section toroid of vacuum insulation 176, formed by thin wall stainless steel 174, which is shown independent of the bottom of the accumulator comprising thin wall stainless steel 175.

FIG. 4 schematically illustrates an accumulator formed of a liquified gas dewar 180; that is, inner and outer thin stainless steel walls 182, 183, the space 184 between which is evacuated. However, the walls 182, 183 converge above the heater 99 so that heat can readily be transmitted from the piece 102 into the interior 186 of the accumulator 180, which in this example contains water.

In operation, when hydrogen is supplied to the pipe 112, it flows as shown by arrows in FIG. 5, downwardly into the catalyst 130. There is no air flow, but the partial pressure of oxygen is greater in the atmospheric air below the louvered plate 110 (see FIG. 4) than is the partial pressure of oxygen inside the space 150 between the louvered plate 110 and the catalyst 130 (see FIG. 6), due to consumption of oxygen in the catalyst 130. Therefore, oxygen diffuses through the louvers 142, 144 and the space 150 to the catalyst, for combustion with hydrogen at the catalyst.

As is known, the reaction products of catalytic combustion of hydrogen and oxygen are heat and water. In this device, various measures are taken to cause the heat to flow upwardly into, for example, a water accumulator portion of a fuel cell power plant, but it could be some other device. In FIG. 6, the top surface 152 of the louver plate 110 is coated with heat reflecting material, such as chromium or aluminum, so as to minimize the flow of heat downwardly to atmosphere below the louvered plate 110.

Water condenses on the bottom surface 156 (FIG. 4, FIG. 5) of the stainless steel piece 102, then flows through the stainless steel screen 124. The condensed water then readily flows through the two sheets of hydrophilic carbon paper 126,

127. Because the pore size of the carbon paper 126, 127 is larger than the pore size of the wicking material 133, the water is thereby sucked into the wicking material 133 where gravity pulls it downwardly to the disk of wicking material 140. The water then flows through the disk 140 to the plugs of wicking material 147 where gravity causes the water to form droplets 153 (FIG. 6) which fall into the environment.

The TEFLON screen 128 provides a thermal barrier to allow the catalyst to achieve an optimum temperature for greatest efficiency, which is about 80° C. (175° F.). If heat is allowed to transfer too rapidly into whatever the device 99 is heating (such as a fuel cell power plant accumulator 180), then the temperature in the catalyst will decrease and the process will be less efficient.

The diffusion rate of oxygen is controlled by the openness of the louvers (the flow path through the louvers) and the distance between the louver plate 110 and the catalyst 130. If too much oxygen reaches the catalyst, the temperature of the catalyst will become locally too high (perhaps as high as several hundred ° C.) which reduces efficiency due to significant heat loss out of the bottom of the device. Thus, maintaining a temperature balance inside the catalyst as well as promoting heat flow upwardly, rather than downwardly, are important aspects of the detailed design of the device described in FIGS. 4-6.

Figure 7:
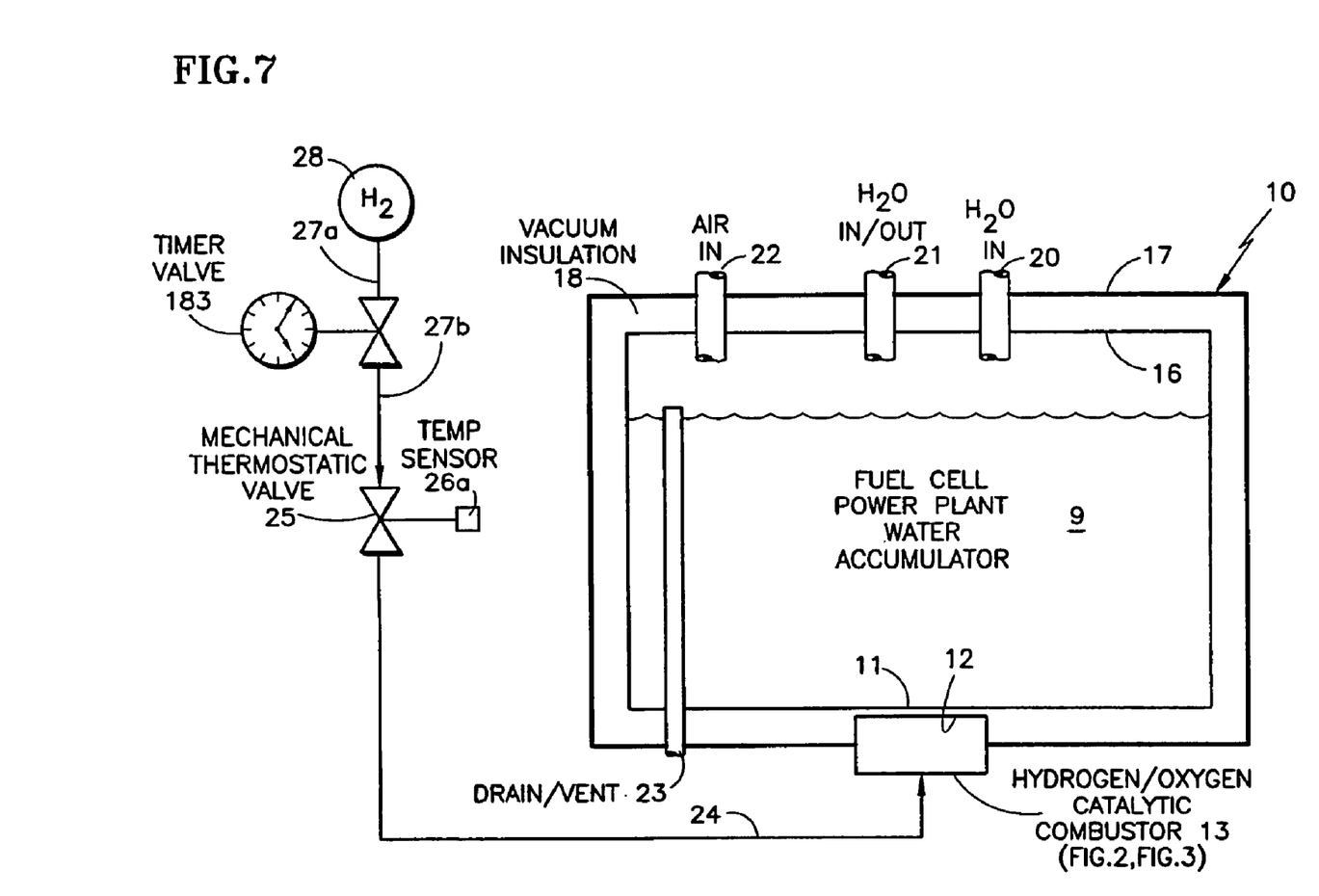
FIG. 7 is a stylized, simplified schematic illustration of a second embodiment of the invention which senses temperature adjacent the accumulator, possibly employing a timer valve.

Alternative valving embodiments of the invention are illustrated in FIG. 7. To avoid heat loss, excessive fuel consumption and costly, complex structure, one embodiment of the invention senses temperature of the ambient atmosphere externally of the accumulator insulation, but adjacent the accumulator, as illustrated in FIG. 7. Therein, the temperature sensor 26*a* is adjacent to the exterior of the vacuum insulation 18 of the accumulator 10. The mechanical thermostatic valve 25 therefore opens and closes in dependence upon the temperature of the ambient. Since the water 9 within the insulated accumulator should always be warmer than in the ambient, particularly if the accumulator is heated, the temperature at which the mechanical thermostatic valve 25 opens can be set, for instance, at 0° C. to assure that the water will never freeze. However, since it is known that the temperature within a properly sealed, Dewar-like accumulator 10 will remain above freezing for several days, automatically heating the accumulator would be an unnecessary waste of fuel (typically on-board fuel of an electric vehicle).

A second embodiment of the invention includes a timer valve 183, in series with the valve 25, which may be set for some appropriate period of time during which providing heat to the accumulator is believed to be unnecessary. The timer may be battery operated, or it may be mechanical. For instance, a spring operated movement may have its spring wound by an electric motor, during the process of shutting down the fuel cell, while there is still power available. The nature of the timer on the timer valve 183 may be conventional and selected to suit any particular implementation of the present invention.

With the combination of the timer valve 183 and the mechanical thermostatic valve 25, the gas will not be provided to the combustor 13 until the ambient temperature falls below the set point of the valve 25, in a time frame following the time out of the timer valve 183. The positions of the valves 25, 183 may be reversed.

In the combustor embodiment of FIG. 6, droplets 153 of condensate 153 falling from the plugs of wicking material 147 will most likely fall on the surface of the ground or a cold floor, particularly when the invention is employed in a vehicle. If the surface and the ambient are below zero, then inverse icicles will begin to build up as the condensate freezes, one drop upon another. The size of the icicles can increase until they encompass part or all of the plugs 147, eventually blocking the path for condensate to escape. Since the combustor will continue to produce water which will pass down through the wicking 133, 140, eventually, the space 150 (FIG. 6) will be filled and the water will contact the catalyst 130. Once the catalyst is flooded, combustion will cease, so that the water 9 inside the accumulator 10, 100 will freeze.

Figure 8:
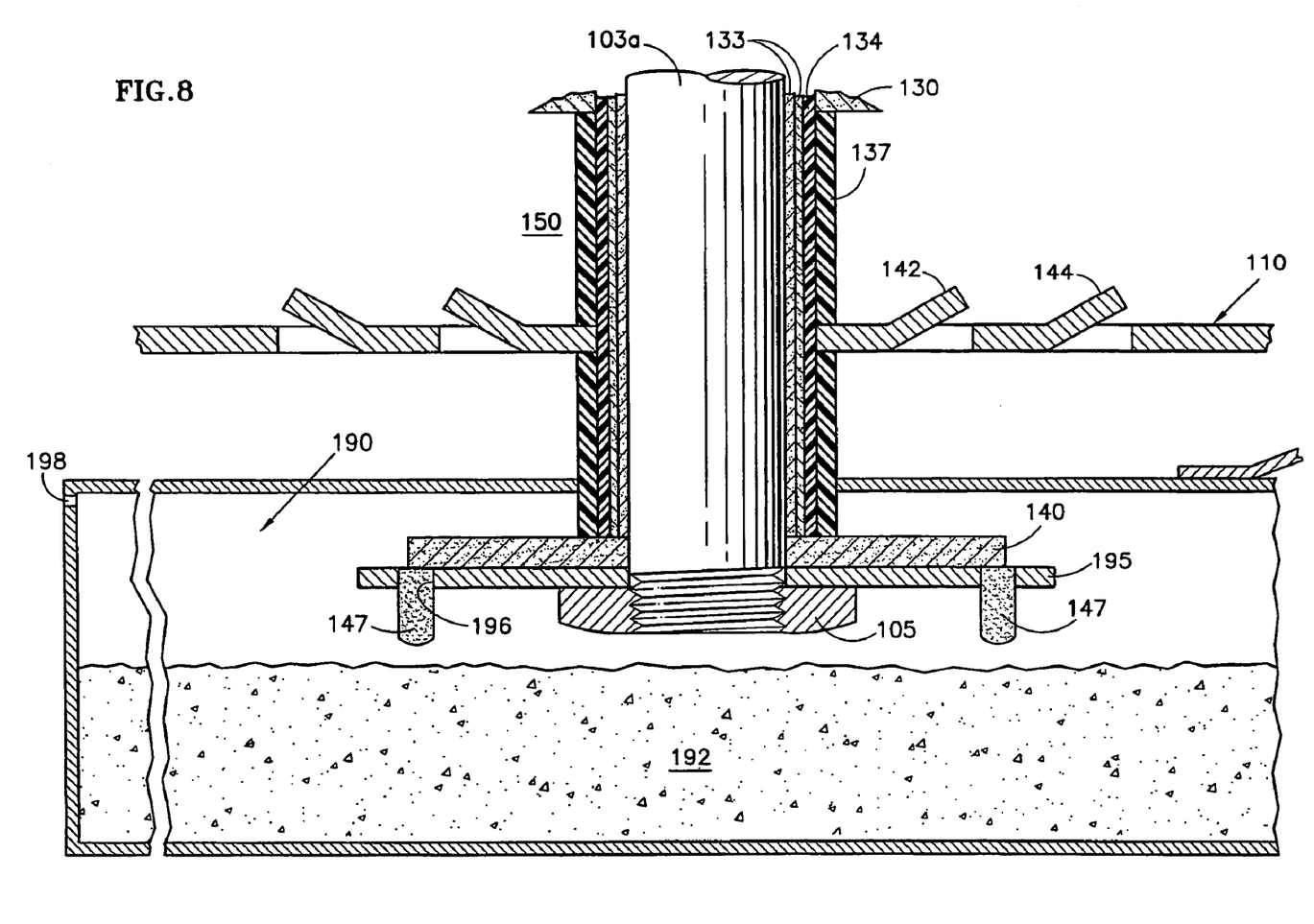
FIG. 8 is a partial, partially sectioned side elevation view of the invention utilizing a salt box to avoid freezing of condensate.

To prevent this, an embodiment of the invention shown in FIG. 8 includes a canister 190 having a substance 192 miscible with water to form a solution which will not freeze above about −50° C. (−60° F.), such as granular $CaCl_2$ salt. This embodiment of the invention is altered from that illustrated in FIGS. 4-6 by utilizing a solid central bolt 103*a*. The bolt 103*a*, the wicking 133, and the plastic wick support 134 all pass through the louvered plate 110 and into the canister 190. In the embodiment illustrated, the canister 190 may be a stainless steel cylinder; however, it may have other configurations within the purview of the invention. The wicking 140, within the canister 190, rests against a washer 195 which has holes 196 therein to accommodate the wicking plugs 147. If the canister 190 is a cylinder, the washer 195 might be square so as to contact the curved surface of the cylinder and provide support to the remaining apparatus. The canister may have overfill preventing drainage devices 198 if appropriate in any implementation of the invention.

Condensate which passes downwardly through the wicking 133 and into the wicking 140 reaches the wicking plugs 147 and drips into the salt 192, thus reducing the likelihood that freezing of the condensate will cause flooding of the catalyst.

Figure 9:
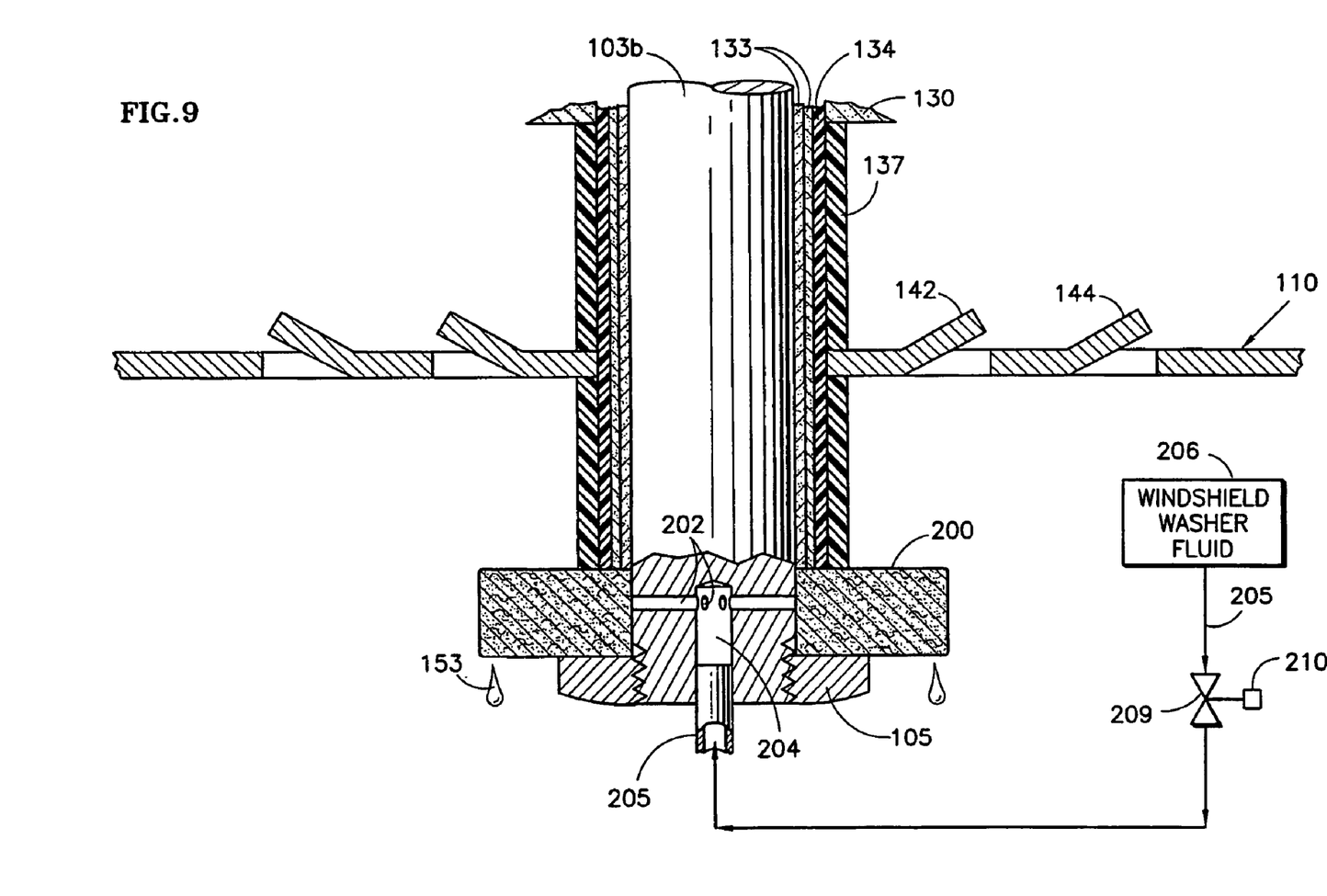
FIG. 9 is a partial, partially sectioned side elevation view of an embodiment of the invention mixing antifreeze with condensate to avoid freezing of condensate in the ambient.

Another embodiment of the invention that avoids catalyst freezing is illustrated in FIG. 9. In FIG. 9, the wicking 133 and wicking support 134 pass through the louvered plate 110 in the same fashion as in FIG. 8 and abut against a porous hydrophilic mixer 200. A plurality of horizontal holes in a bolt 103*b*, which may comprise six radial holes 202, provide a capillary fluid connection between the porous hydrophilic mixer 200 and an axial capillary fluid passageway 204 drilled into the bolt 103*b*. A capillary pipe 205 is pressed into the hole 204 and is in fluid communication with a thermostatic valve 209 responsive to a temperature sensor 210 which conducts antifreeze from a source, such as a source 206 of windshield washer fluid (which is convenient in case the invention is used in an electric vehicle powered by a fuel cell, for instance).

In this embodiment of the invention, windshield washer fluid, or other antifreeze, from the source is drawn into the hole 204 through the capillary tube 205. The antifreeze will pass through the radial holes 202 into the porous hydrophilic mixer 200 where it mixes with condensate, the mixture thereafter dripping to the surface below the accumulator (153).

Figure 10:
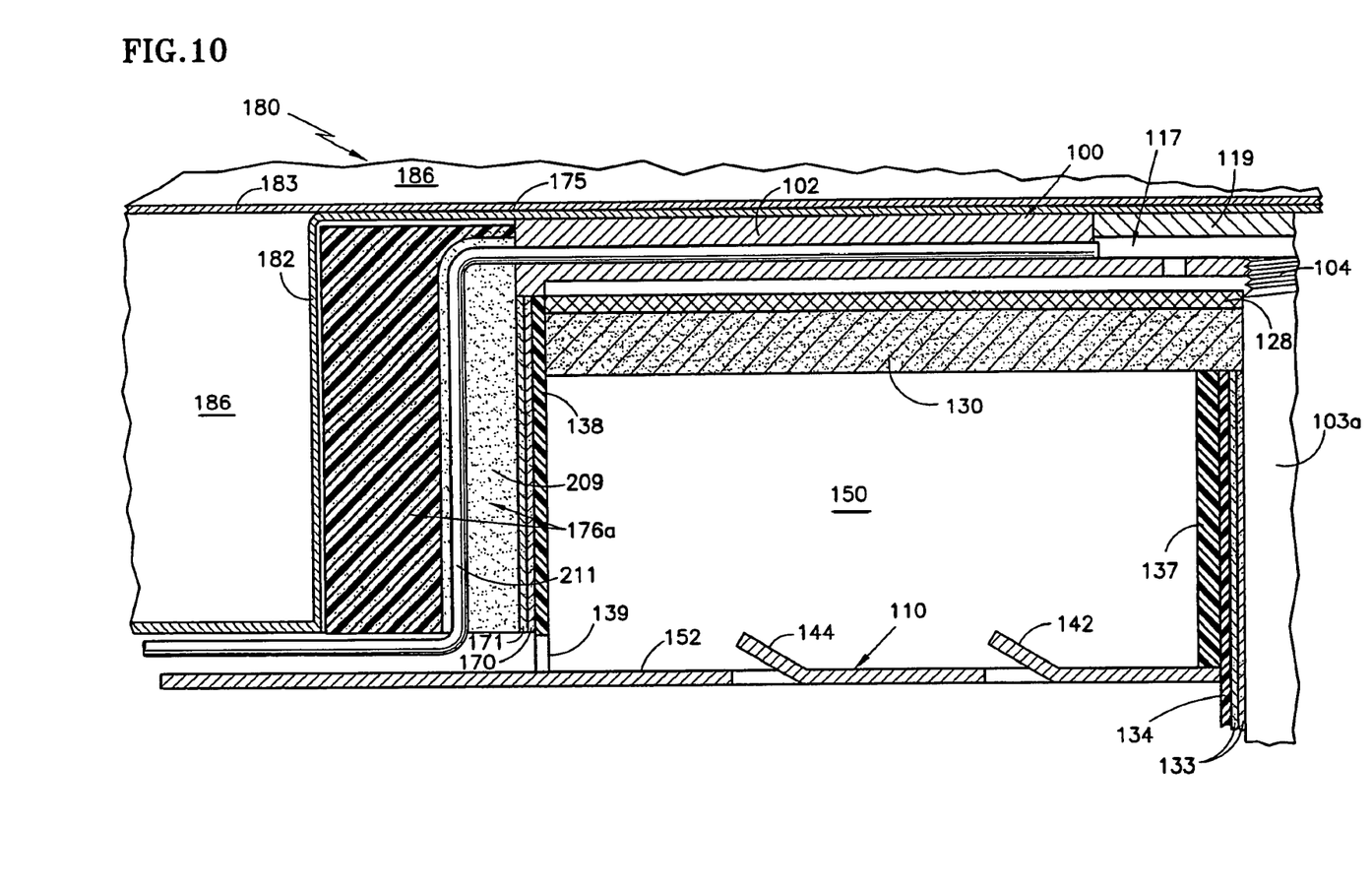
FIG. 10 is a partial, partially sectioned, side elevation view of a hydrogen feed tube which may be used with the embodiments of FIGS. 8 and 9.

In the case of the embodiment of FIG. 9, because the hole 204 receives the capillary tube 205, the hydrogen source tube 112 (FIG. 6) cannot be used as in other embodiments. In FIG. 10, an alternate route for the hydrogen is shown. Therein, the insulation 44 (FIG. 3) immediately adjacent to the catalytic heater is not an evacuated space 176 (as shown in FIG. 4), but rather is porous urethane insulation 176*a*. A thin slot 209 is cut into the insulation 176*a* so as to provide a passageway for a capillary tube 211 which feeds the hydrogen from the valve 25 to the central bore 117. In the embodiment of FIG. 8, a tube 112 (as in FIGS. 4-6) might be led from the valve 25 through the salt box and into a hollow bolt 103, as described in FIGS. 4-6 hereinbefore, if desired, or the tube 211 may be used as illustrated in FIG. 10, as suits any implementation of the present invention.

Figure 12:
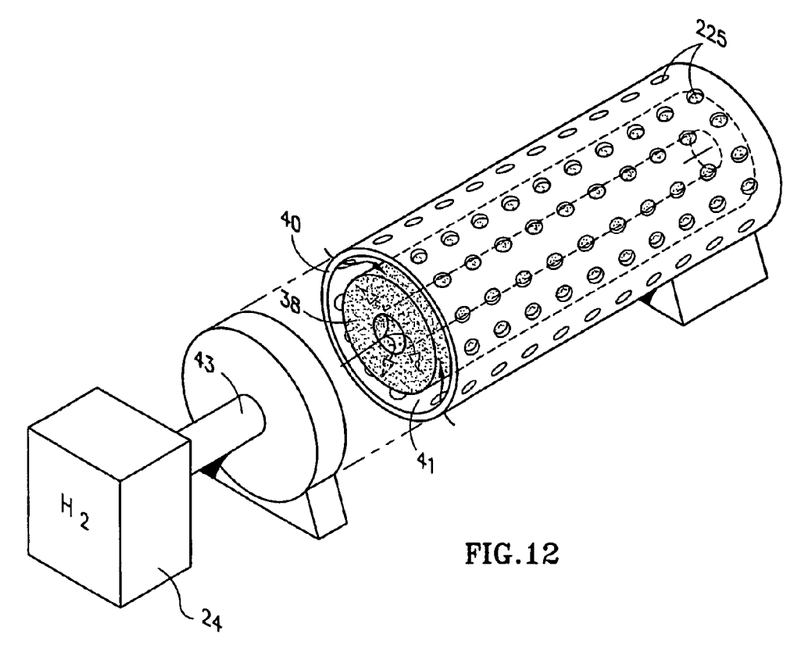
FIG. 12 is an exploded, partially sectioned perspective view of a cylindrical diffusion combustor of the invention.

Referring to FIG. 12, another configuration of the invention is illustrated. In this case, the catalyst, which may comprise a mixture of catalytic material (such as noble metal) with hydrophobic material (such as TEFLON®) deposited onto a substrate 38 of porous metal, is a porous cylinder, the center of which is connected to the hydrogen feed pipe 43, and the outer surface of which faces the space 41 between the diffusion control plate 40, which is also a cylinder having a plurality of holes 225 therein. Operation of the device of FIG. 12 is well suited to heat a space, although it could be used to heat a suitably arranged object as well.

The invention claimed is:

1. A system for keeping a medium (9) in a container (10) warm, comprising:
a container (10) having a heatable surface (11) through which heat may be conducted into a medium (9) within the container; and
a supply (28) of hydrogen;
characterized by:
a first valve operable to be closed unless the time period of a related timer has expired after said first valve has been armed to become open;
a second valve (25) having a temperature responsive member (26) disposed in proximity with said container and responsive to either (i) the temperature of the container or (ii) the ambient temperature surrounding the container, said second valve operable to open in response to said temperature responsive member being below a first temperature and to close in response to said temperature responsive member being above a second temperature, said second temperature being not lower than said first temperature, said valves serially connected to said supply to provide, when said valves are both open, a source (24) of hydrogen for combustion to heat said heatable surface; and
a hydrogen/oxygen catalytic combustor (13) selected from
(a) an ejector combustor (13a) comprising—
a heating surface (36), through which heat is to be conducted to a heat utilizing apparatus;
an ejector (32) having an outlet, a primary inlet (31) in fluid communication with said source of hydrogen, and a secondary inlet (33) in fluid communication with air;
and a hydrogen/oxygen combustion catalyst (34) disposed between said ejector outlet and said heating surface; and
(b) a diffusion combustor (13b) comprising:
a hydrogen/oxygen combustion catalyst (38) having first and second sides;
a heating surface (12), through which heat is to be conducted to a heat utilizing apparatus, separated from said first side of said catalyst by a first space (39);
a hydrogen conduit (43) for conducting hydrogen from said source to said first space; and
a diffusion control device (40) disposed in air and separated from said second side of said catalyst by a second space (41);
said heatable surface in contact with one of said heating surfaces, whereby hydrogen passing through said valves is catalytically combusted to heat the medium within said container.

2. A system according to claim 1 wherein:
said container (10) is an accumulator of a fuel cell power plant.

3. A system according to claim 1 wherein:
said first valve is a timer-operated valve.

4. A system according to claim 1 wherein:
said second valve is a thermostatic valve.

5. A temperature-responsive hydrogen source for a keep-warm system, comprising:
a container (10) having a heatable surface (11) through which heat may be conducted into said container; and
a supply (28) of hydrogen;
characterized by:
a valve (25) having a temperature responsive member (26) in proximity with said container and responsive to either (i) the temperature of the container or (ii) the ambient temperature surrounding the container, said valve operable to open in response to said temperature responsive member being below a first temperature and to close in response to said temperature responsive member being above a second temperature, said second temperature being not lower than said first temperature, said valve connected to said supply to provide, when said valve is open, a source (24) of hydrogen for combustion to heat said heatable surface.

6. A freeze-proof container characterized by:
a source according to claim 5; and
a hydrogen/oxygen catalytic combustor (13) for combusting hydrogen from said source (24) to heat said heatable surface (11).

7. A container according to claim 6 wherein:
said valve (25) is in thermal contact (26) with said container (10).

8. An accumulator for a fuel cell power plant characterized by:
a container according to claim 6.

9. A hydrogen/oxygen catalytic combustor (13a) characterized by:
a heating surface (36), through which heat is to be conducted to a heat utilizing apparatus (10);
an ejector (32) having an outlet, a primary inlet (31) in fluid communication with a source (24) of hydrogen, and a secondary inlet (33) in fluid communication with air; and
a hydrogen/oxygen combustion catalyst (34) disposed between said ejector outlet and said heating surface.

10. A hydrogen/oxygen catalytic combustor (13b), characterized by:
a hydrogen/oxygen combustion catalyst (38) having first and second sides;
a hydrogen conduit (43) for conducting hydrogen from a source (24) to said first side; and
a diffusion control device (40) disposed in air and separated from said second side of said catalyst by a second space (41).

11. A combustor according to either of claim 9 or 10 wherein said catalyst comprises:
a coating of catalyst material on a porous metal substrate.

12. A combustor according to either of claim 9 or 10 wherein said catalyst comprises:
a mixture of catalyst material and hydrophobic material on a porous substrate.

13. A combustor according to either of claim 9 or 10 wherein said catalyst (38) comprises:
a porous metal substrate (130), the interior surfaces of which are washcoated with a mixture of polytetrafluoroethylene and a noble metal or alloys thereof.

14. A combustor according to claim 13 wherein:
said noble metal is selected from platinum, palladium and alloys of platinum and/or palladium.

15. A combustor according to claim 10 further comprising:
an insulator (44) surrounding said catalyst, said first space and said second space; and wherein:

said diffusion control device (40) extends beyond said second space (41) to substantially the outer periphery of said insulator.

16. A combustor according to claim 10 wherein:
said first space (39) includes a metal screen (124).

17. A combustor according to claim 10 wherein:
said first space (39) contains a second surface (156) upon which moisture generated by combustion in said catalyst (38) condenses; and further characterized by:
a hydrophilic mesh (126, 127) having pores of a first size disposed below said second surface; and
a wicking material (133, 140, 147) having pores of a second size smaller than said first size extending from said mesh to a point below said diffusion control plate (40, 110).

18. A combustor according to claim 17 further characterized by:
a chamber (190) disposed below said diffusion control plate and adapted to receive said condensate, said chamber containing a substance (192) which with said condensate forms a liquid which has a freezing temperature below −50° C. (−60° F.).

19. A combustor according to claim 18 wherein said substance is $CaCl_2$ salt.

20. A combustor according to claim 17, further characterized by:
a porous hydrophilic mixer (200) disposed below said diffusion control device (40) to receive said condensate;
a source (206) of antifreeze miscible with water; and
at least one capillary tube (205) interconnecting said source of antifreeze with said porous hydrophilic mixer, whereby said condensate mixes with antifreeze and the antifreeze mixture drips into ambient from said porous hydrophilic mixer.

21. A combustor according to claim 20 wherein said antifreeze is windshield washer fluid.

22. A combustor according to claim 17 wherein:
said condensate is conducted to ambient.

23. A combustor according to claim 10 wherein;
said catalyst (38, 130) is a porous cylinder having a central bore disposed with its axis vertical.

24. A combustor according to claim 23 wherein:
a hydrogen conduit (112, 103) passes through said central bore to provide hydrogen to said first space.

25. A combustor according to claim 23 wherein:
said first space (39) contains a second surface (156) upon which moisture generated by combustion in said catalyst (38) condenses; and further characterized by:
a hydrophilic mesh (126, 127) having pores of a first size disposed below said second surface; and
a wicking material (133, 140, 147) having pores of a second size smaller than said first size extending through said central bore from said mesh to a point below said diffusion control device (40, 110).

26. A combustor according to claim 10 wherein:
said diffusion control device (40) limits the amount of oxygen diffused therethrough to thereby limit the temperature of said catalyst.

27. A combustor according to claim 10 wherein:
said catalyst comprises a porous cylinder, the interior of which comprises said first side and the exterior of which comprises said second side; and
said diffusion control device (40) comprises a cylinder surrounding said catalyst and spaced therefrom, and having oxygen diffusion holes (225) therein.

\* \* \* \* \*